United States Patent Office 3,676,037
Patented July 11, 1972

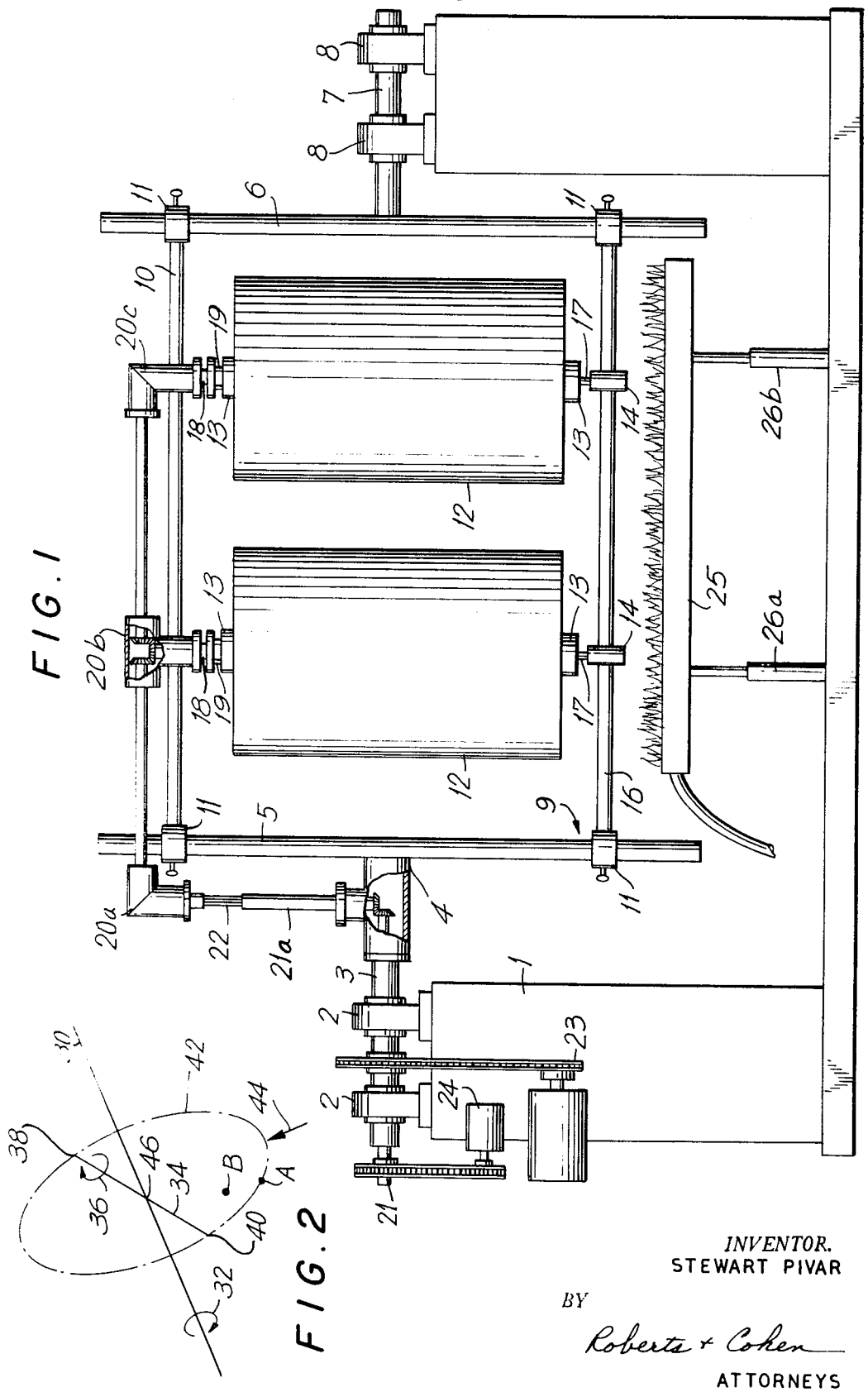

3,676,037
APPARATUS FOR MOLDING HOLLOW
PLASTIC ARTICLES
Stewart Pivar, 1 Lynn Drive, Muttontown, N.Y.
Continuation of abandoned application Ser. No. 724,803,
Apr. 29, 1968. This application Jan. 4, 1971, Ser.
No. 103,893
Int. Cl. B29c 5/04
U.S. Cl. 425—435
6 Claims

ABSTRACT OF THE DISCLOSURE

Apparatus for molding hollow plastic articles in which a mold is simultaneously rotated about two mutually perpendicular axes, a source of heat being located at a position generally radially displaced relative to a circle described by the mold. The mold is supported in a frame which is of adjustable size, there being provided a telescopic drive for rotating the mold and which is extensible to accommodate adjustment in the frame.

RELATED APPLICATIONS

This application is a continuation of Ser. No. 724,803, filed Apr. 29, 1968, now abandoned.

DRAWING

FIG. 1 is a generally diagrammatic front view of a molding apparatus provided in accordance with the invention; and FIG. 2 is a diagram illustrating in perspective the geometric relationships of the different elements of the process of the invention.

DETAILED DESCRIPTION

This invention relates to apparatus for molding hollow objects of thermoplastic materials and particularly those in the form of fluids or finely divided powders such as vinyl plastisols and powdered polyolefins.

A method of molding called rotational molding has been known for many years and is widely used. This method involves the use of hollow molds rotatable simultaneously about two mutually perpendicular axes within a heating oven. Such machines generally embody three spindles each mounted with a plurality of molds. The spindles are arranged to enter consecutively three stations, these being the heating oven, a cooling chamber and an area whereat the molds are emptied and recharged. The oven usually includes a system to circulate the air for the purpose of evenly distributing the heat. Where a multiplicity of small molds is being used, the output of molded parts per unit time can be quite large. This is not the case, however, when large moldings are being made where limitations in the size of the heating oven preclude the use of more than one mold at a time.

In cases where the number of molded pieces required is small, it is not economically feasible to build a large number of molds. In such instances, oven-type rotational molding machines do not function efficiently and do not justify their high cost.

The apparatus which is the subject of the present invention provides simpler and less expensive means to manufacture hollow thermoplastic moldings.

The invention, in accordance with one embodiment, comprises means to rotate a mold simultaneously about two mutually perpendicular axes with gas burners located beneath the rotating mold to act as a source of heat. It would ordinarily seem that such a source of heat in this type of molding is at variance with those principles long thought to be essential to the formation of a satisfactory hollow molding, namely that all parts of the mold must be exposed equally to the source of heat such as is the case within a heating oven. However, this also turns out to be the case in the instant invention for reasons which will be discussed hereinafter.

The invention also provides novel and improved means of creating the necessary rotational movements of the mold which are uniquely adaptable to an apparatus which is not constrained to function in the confined environment of the inside of a heating oven.

Referring to FIG. 1, on a supporting frame 1 are mounted drive shaft pillow blocks 2 which support a hollow drive shaft 3, an end of which is attached to a right angle drive or T-coupling 4 which in turn is attached to and supports a radial member 5 of the rotation frame 9. At the opposite end of the machine is another radial member 6 which is supported by a shaft 7 which is free to rotate in and is supported by pillow blocks 8. The rotation frame 9 comprises also two horizontal members 10 and 16 which are attached adjustably to the radial members by sliding clamps 11 by means of which the horizontal members may be set at any distance from each other permitted by the extent of the distance of travel along the radial members.

Molds are mounted removably on the rotation frame by means of mold brackets 13 attached to the molds which engage attaching clamps 14 which are attached to the horizontal member 16 and to which are attached pins 17 which engage a hole in the mold bracket 13 in which it is free to rotate. The opposite end of the mold is attached to drive brackets 18 to which are attached two pins 19 which withdrawably enter corresponding holes in the mold bracket 13.

Rotation is imparted to the molds through the drive brackets 18 by means of a secondary drive shaft system comprising right angle drives 20a–c which transmit the power from the secondary drive shaft 21 which passes through the hollow drive shaft 3. The telescoping shaft 21a is a keyed hollow telescoping shaft, the bore of which engages shaft 22 which is free to slide in and out when the horizontal member is adjusted to different positions along the radial members 5 and 6. Power is supplied to the drive shaft by a motor 23 and to the secondary shaft 21 by a motor 24.

A burner 25 is located beneath the molds and is supported adjustably by the burner supports 26a and b which permit a raising or lowering of the position at which the burner is set. The length of the burner is less than the distance between the radial members 5 and 6.

The steps of producing a molded article by the apparatus described in the subject invention are as follows: a measured quantity of fluid or powdered thermoplastic molding material is placed into a mold which is mounted on the machine by engaging the associated mold brackets 13 with the attaching clamps 14 and the drive brackets 18. The burner is raised to a position as close as possible to the mold by adjusting the mold support brackets 26a and b.

The mold is caused by operation of motors 23 and 24 to rotate simultaneously about the two mutually perpendicular axes for a preset interval of time which usually amounts to two to five minutes while being exposed to the heat of the gas burners. At the end of this interval, rotation is halted. The burner is then turned off and the mold is dismounted for cooling and is thereafter emptied of the finished molded article therein.

The mold chosen for illustration in the drawing is irregular in shape in the thermal sense in that some parts thereof are very much closer than others to the source of heat during rotation. It might be expected that these areas will receive more heat and consequently will produce a greater wall thickness in the corresponding areas of the molded article. However, examination of a finished molded article reveals satisfactory distribution of the material over the surface of the mold.

This phenomenon can be understood by an analysis of the motion imparted to a given point on the mold surface with respect to its distance from the heat source. The velocity of such a point during rotation is more or less inversely proportional to the distance from the heat source. Points at a greater distance from the heat source will tend to remain exposed to heat for a proportionally longer time thereby tending to minimize the ostensible inequity. Observation of the apparatus in operation will show that the extremities of an irregularly shaped mold will actually pass through the flames while parts close to the center of rotation may be a foot or more from the flames. However, it is seen that the greater velocity of the extremities causes these parts to pass through the flames in a fraction of a second while the parts remote from the flames are exposed to heat for a noticeably longer period of time.

The apparatus as illustrated in FIG. 1 accommodates two molds. The rotation frame is shown supported at both ends. It can be supported by the drive shaft alone especially if only one mold is to be used. By building the rotation frame sufficiently long, four or five molds can be used simultaneously. Such a machine will never-the-less require about one-fifth the space required by an over-type rotational molding machine.

Reference to FIG. 2 will provide a diagrammatic illustration of some of the principles involved in the process of the invention. In FIG. 2, line 30 represents one of the two mutually perpendicular axes referred to above and in particular represents the axis about which the frame of the apparatus rotates such as, for example, in the direction indicated by arrow 32. Line 34 indicates the axis of the mold which second axis is perpendicular with the axis 30. The mold rotates in one direction or the other as indicated by way of example by arrow 36.

Generally speaking, the ends of the mold can be assumed to exist at the ends of axis 34 such as at 38 and 40. During the rotation contemplated in accordance with arrow 32, the ends 38 and 40 will describe a circle 42 concentric with axis 30 and lying in a plane which is perpendicular to the latter. The source of heat is indicated by arrow 44, this being directed radially inwards with respect to circle 42 towards the center 46 of the circle. The source 44 will preferably be located in a position at least substantially tangential to the circle.

It follows from what has been stated above that a method of manufacture is contemplated whereby a hollow mold is charged with a thermoplastic material, the mold being rotated simultaneously on two mutually perpendicular axes whereby the axis of the mold, which may for example be cylindrical in shape, moves through a plane perpendicular to the other axis and during which movement heat is directed from a fixed position spaced from the axis 30 but in a radially inwards direction towards the latter and against the mold to heat the material therein to form a molded product.

The heating means as illustrated is preferably an elongated gas burner which is parallel to the axis 30 and perpendicular to the plane of the circle 32. The diameter of the circle 42 will be determined by the dimensions of the mold for whose variance the support members 10 and 16 are provided in adjustable relationship. It will be noted of course that members 10 and 16 are preferably arranged in parallel relationship with respect to the axis 30 and that members 5 and 6 extend generally radially with respect to the latter said axis.

An inspection of FIG. 1 will also reveal that the T-shaped drive member 4 is coaxially related to the axis 30 as is the supporting member 7.

Finally, as described above, it will be appreciated that a point A on the periphery of circle 42 will have a linear velocity which is greater than that of a point B lying closer to the center 46 as a result of which point A will spend less time in the vicinity of the source of heat than will the point B. This is due to the heat gradient between the source of heat, which is outside of the circle, and the center 46 of the circle. By taking advantage of this, the invention provides for a novel and useful technique which has not been heretofore available.

There will now be obvious to those skilled in the art many modifications and variations of the apparatus and method set forth hereinabove. These modifications and variations will not depart from the scope of the invention if defined by the following claims.

What is claimed is:

1. Apparatus for manufacturing hollow plastic articles comprising a mold in which said articles are formed, means for rotating said mold simultaneously about two mutually perpendicular axes, one of said axes being the longitudinal axis of said mold and the other axis extending through a central portion of the mold, the mold having extremities spaced from said other axis which describe a circle concentric about said other axis, and heating means fixed in a position adjacent and outside of said circle and providing a localized source of heat outside of the circle with a heat gradient extending toward the center of the circle, said heating means being a device for supplying a row of flames located beneath said mold, said row of flames being parallel to said other axis whereby said extremities are intermittently exposed to said flames and whereby the flames create an upward movement of heated air which envelopes said mold.

2. Apparatus as claimed in claim 1, wherein said heating means is an elongated burner parallel to said other axis and perpendicular to the plane of said circle.

3. Apparatus as claimed in claim 1, wherein the first said means includes a frame comprising spaced end members extending radially with respect to said other axis, and support members in adjustable relation between said end members, said mold being supported by said support members between said end members such that said mold is rotated symmetrically on said other axis.

4. Apparatus as claimed in claim 3, wherein the first said means includes a drive means rotating the mold on said one axis and wherein said drive means includes a telescopic coupling means to accommodate adjustment of the support members.

5. Apparatus as claimed in claim 1, wherein the first said means includes a frame, means rotatably supporting the mold on said frame, a T-shaped coupling connected to said frame, a motor coupled to and driving the T-coupling to rotate the frame on said other axis, two secondary drive shafts perpendicular to each other and extending into engaged driving relationship within the T-coupling, a motor coupled to and driving one and thereby the other of said shafts, and means coupling one of the said shafts to said mold to rotate the latter on said one axis.

6. Apparatus as claimed in claim 5, wherein the frame includes adjustably related members and one of said shafts includes telescopically related parts to accomodate adjustment of the said members.

References Cited

UNITED STATES PATENTS

| | | | |
|---|---|---|---|
| 3,337,662 | 8/1967 | Spencer | 18—26 RR X |
| 3,134,140 | 5/1964 | Knowles | 18—26 RR |
| 3,510,911 | 5/1970 | Alter | 18—26 RR |

J. SPENCER OVERHOLSER, Primary Examiner

J. E. ROETHEL, Assistant Examiner

U.S. Cl. X.R.

425—182, 434